Jan. 1, 1935.  B. D. BEDFORD  1,985,912
ELECTRIC VALVE CONVERTING SYSTEM
Filed Aug. 25, 1933
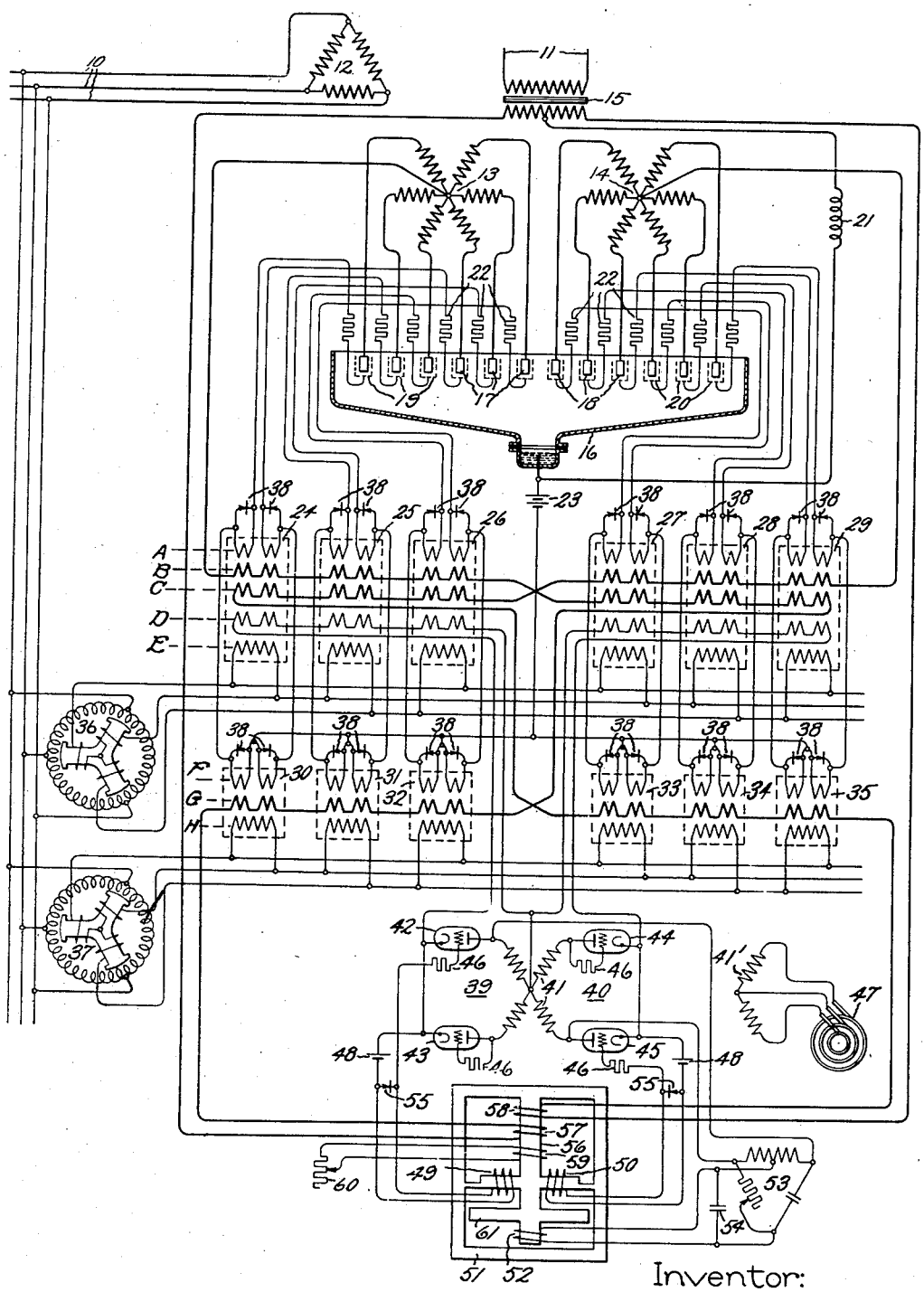
Inventor:
Burnice D. Bedford,
by Harry E. Dunham
His Attorney.

Patented Jan. 1, 1935

1,985,912

UNITED STATES PATENT OFFICE 1,985,912

ELECTRIC VALVE CONVERTING SYSTEM

Burnice D. Bedford, Schenectady, N. Y., assignor to General Electric Company, a corporation of New York Application August 25, 1933, Serial No. 686,763

27 Claims. (Cl. 172—281)

REISSUED

My invention relates to electric valve converting systems for transmitting energy between independent alternating current circuits of different frequencies and more particularly to improved excitation apparatus for such converting systems which will enable the systems to operate satisfactorily under widely variable load conditions.

In United States Letters Patent No. 1,930,303, granted April 15, 1933, upon my application, there are disclosed several electric valve frequency changing systems for transmitting energy between alternating current circuits of different frequencies, together with excitation apparatus therefor, suitable for transmitting energy to a leading or lagging power factor alternating current load circuit. My present invention constitutes an improvement upon that which forms the subject matter of the above mentioned patent and is directed principally to improving the flexibility of electric valve converting systems to secure optimum operation under widely variable operating conditions. For example, in the arrangements of the prior art for supplying reactive load it has been proposed to excite certain of the electric valves for inverter operation to transmit current during those portions of the load cycles when current flows against the applied electromotive force. In such systems it is necessary that the inverter valve excitation lead the applied electromotive force by a predetermined angle to insure commutation under heavy load conditions, this angle being known as the commutating angle. Under light load conditions it is desirable to have this commutating angle a minimum in order to prevent unnecessary distortion of the wave form of the output voltage. Many of such converting systems also have substantial natural voltage regulation so that it is desirable to compensate or compound for this natural regulation by advancing the phase of the component of rectifier excitation. Again when it is desired to transmit energy between two circuits having a non-integral frequency ratio, the output voltage wave generally comprises a series of input half cycles and intermittently the number of half cycles is increased by one to take care of the fractional relationship in the frequencies of the circuits. If these additional input half cycles are added to even numbered half cycles of the load frequency, certain portions of the converting system will carry a resultant unidirectional component of current which will tend to saturate any transformer windings included in this circuit. My invention comprises an improved electric valve converting system and an improved excitation apparatus therefor which will provide a solution to the above mentioned problems and which will considerably simplify the excitation apparatus of the converting systems of the prior art.

It is an object of my invention, therefore, to provide a new and improved electric valve converting system and an improved grid excitation apparatus therefor which will simplify the systems of the prior art and which will solve the above mentioned problems.

It is another object of my invention to provide a new and improved valve converting system and an excitation apparatus therefor which will automatically regulate the output voltage of the system to compensate for its natural regulation characteristics.

It is a further object of my invention to provide an improved electric valve converting system, and an excitation apparatus therefor, suitable for transmitting energy from an alternating current supply circuit to an alternating current load circuit under reactive power conditions by means of which the commutating angle of the electric valves operating as inverters will be varied in accordance with the load transmitted by the apparatus.

It is a still further object of my invention to provide an improved electric valve converting system and an excitation apparatus therefor suitable for transmitting energy between alternating current circuits having a non-integral frequency ratio by means of which the current transmitted by the several groups of electric valves will be automatically balanced.

In accordance with my invention, alternating current circuits of different frequencies are interconnected through a plurality of groups of electric valves. The circuits of different frequencies will be referred to hereinafter as the higher frequency circuit and the lower frequency circuit, respectively, but it is to be understood that the terms "higher" and "lower" are used only in a relative sense and that my invention is not limited to any particular order of magnitude for the frequencies of the respective circuits. The several electric valves are excited for inverter operation to transmit energy from the lower frequency circuit to the higher frequency circuit and there is provided means for modifying the inverter excitation to increase the commutating angle of the inverting valves with an increase in load current of the system. There is also provided a component of rectifier excitation for the several groups of valves and this rectifier excitation is periodically and successively removed from the several groups of valves at the frequency of the lower frequency circuit so that the groups of valves act successively as the rectifiers supplying successive half cycles of alternating current to the load circuit.

In order to prevent a simultaneous flow of current of more than a predetermined magnitude in more than one group of electric valves, which would tend to become a short circuit on one or both of the supply and load circuits, there is provided a means responsive to the flow of current in each group of valves for removing the rectifier excitation from the other valves. This rectifier excitation is also varied in response to the load current transmitted by the system to compensate for the natural regulation characteristics of the system. To provide for the case in which the system is to transmit energy between alternating current circuits having a non-integral frequency ratio, there is provided means responsive to an unbalance in the current transmitted by the several groups of valves to modify the rectifier excitation of these groups of valves in such a way as to restore this balance and thus prevent any unidirectional component in the transformer windings of the system which would tend to saturate them.

For a better understanding of my invention, together with other and further objects thereof, reference is had to the following description taken in connection with the accompanying drawing in which the single figure diagrammatically illustrates my invention as applied to a system for transmitting energy from a three-phase alternating current supply circuit of higher frequency to a single phase alternating current load circuit of lower frequency.

Referring more particularly to the drawing, there is shown a system for transmitting energy from a three-phase higher frequency alternating current supply circuit 10 to a single phase lower frequency alternating current load circuit 11. This apparatus includes a transformer bank provided with a three-phase primary network 12 connected to the supply circuit 10 and a pair of six-phase star connected secondary networks 13 and 14 connected to supply opposite halves of the primary winding of an output transformer 15, the secondary winding of which is connected to the circuit 11. The networks 13 and 14 supply their respective portions of the primary winding of the transformer 15 through a plurality of electric valves or electric valve paths. These valves may be of any of the several types well known in the art and may comprise a plurality of single anode, single cathode valves or, as illustrated in the drawing, they may comprise a multiple-anode, single cathode vapor electric discharge device 16. As illustrated in the drawing, the several phase terminals of the network 13 are connected to the anodes 17 of the discharge device 16 while the electrical neutral of the network 13 is connected to one terminal of the primary winding of the transformer 15. Similarly, the phase terminals of the network 14 are connected to the anodes 18 of the discharge device 16 while its electrical neutral is connected to the other terminal of the primary winding of the transformer 15, the electrical neutral of this latter winding being connected to the cathode of the electrical discharge device 16 through a current smoothing reactance device 21. The groups of anodes 17 and 18 are provided with associated control grids 19 and 20, respectively, connected to the cathode of the discharge device 16 through current limiting resistors 22, appropriate windings of grid transformers, which will be described in more detail hereinafter, and a negative bias battery 23.

In order to control the valve converting system to produce the objects noted above, there are provided a plurality of control transformers 24–29, inclusive, to provide rectifier excitation for the groups of electric valves or valve paths 17 and 18, and a group of control transformers 30–35, inclusive, to provide inverter excitation for these valve paths. Each of the control transformers 24–29, inclusive, is provided with five groups of windings; the A windings, which are the secondary, or output, windings for exciting the grids 19 and 20; the B windings, which are connected in series with the load current of the particular group of valves which the transformers control; the C windings, which are connected in series with the load current of the other group of valves; the D windings, which are energized with a lower frequency alternating potential to periodically and successively remove the rectifier excitation, as will be described more fully hereinafter; and the E windings, which are the main primary windings of the control transformers and are energized from the alternating current supply circuit 10 through any suitable phase shifting arrangement such, for example, as a rotary phase shifting transformer 36.

Similarly the inverter excitation transformers 30–35, inclusive, are provided with secondary or output windings F connected to the proper control grids 19 and 20; the windings G, connected in series with the current transmitted by the valves which the transformers control; and the windings H, which are the primary or excitation windings energized from the alternating current supply circuit 10 through a suitable phase adjusting means, such as a rotary phase shifting transformer 37.

It will be noted that the windings A and F are connected in series and that each pair of windings A—F is connected to the grid associated with the anode which is connected to the particular phase terminal of the networks 13 or 14 corresponding to the phase from which the windings E and H of the control transformers are energized. Thus, each grid receives two components of higher frequency alternating potential, one, a component for rectifier excitation approximately in phase, and the other, a component for inverter excitation approximately in phase opposition, to the potential impressed upon its corresponding anode.

Unilaterally conductive devices, such as contact rectifiers 38, are preferably connected in parallel to each of the windings A and F to bypass the negative half cycles of control potentials from the grids. Each of the control transformers 24–35, inclusive, is preferably of the self-saturating type so that it will become saturated from the energization of the exciting windings E and H. The result is that alternating potentials of a peaked wave form are impressed upon the grids of the several valve paths. The control transformers 24–35, inclusive, are also designed to become saturated by predetermined currents in other of their exciting windings, as will be explained in more detail hereinafter.

As explained above, the windings D on the control transformers 24–29, inclusive, are for the purpose of periodically and successively removing the rectifier excitation from the groups of control transformers 24, 25 and 26, and 27, 28 and 29.

To this end they may be energized from an auxiliary electric valve rectifying circuit. In the particular converting circuit illustrated, the maximum duration of rectifier excitation, corresponding to unity power factor on the load circuit 11, is somewhat less than 180 electrical degrees, referred to the load circuit. Under other power factor conditions, the periods of rectifier excitation are shorter, so that the intervals during which rectifier excitation must be renewed are greater than 180 electrical degrees. This result may be obtained by energizing the windings D of the groups of transformers 24, 25, and 26 and 27, 28, and 29 from the auxiliary electric valve rectifying circuits 39 and 40, respectively. The rectifier 39 comprises two phases of a supply transformer network 41 and a pair of electric valves 42 and 43, while the rectifier 40 comprises two phases of the network 41 and electric valves 44 and 45. The network 41 may constitute the secondary network of a transformer having a primary network 41' connected to a source of alternating current 47 of a frequency which it is desired to supply the load circuit 11, although it will be understood that, if the circuit 11 is connected to an independent source of electromotive force for determining its frequency, the network 41' may be energized directly therefrom or the generator 47 may be driven from a synchronous motor energized from the network 11.

Electric valves 43 and 44 may be simple rectifier valves or their grids may be connected to their anodes through current limiting resistors 46, as illustrated, to obtain an equivalent effect. The grids of electric valves 42 and 45, however, are connected to their respective cathodes through current limiting resistors 46, negative bias batteries 48 and secondary windings 49 and 50 of a transformer device 51, the primary winding 52 of which is energized from diametrically opposite terminals of the network 41 through any suitable phase adjusting means such as an impedance phase shifting circuit 53. A capacitor 54 may be connected across the phase shifting circuit 53 to compensate for the reactance of the transformer device 51 and contact rectifiers 55 may be connected across the windings 49 and 50, if desired, to shunt the negative half cycles of control potentials from the grids of electric valves 42 and 45.

It will be noted that the windings 49 and 50 are mounted on branches of the magnetic core of the device 51 having contracted or saturable sections, the result of which is to convert the potential impressed upon the primary winding 52 into alternating potentials of peaked wave form, a device well known in the art. The magnetic circuits of the windings 49 and 50 have a common magnetic path or core sections 56 upon which are mounted windings 57 and 58 connected in series with the groups of anodes 17 and 18 respectively. The magnetic core section 56 is also provided with an additional winding 59 which is short circuited through a low impedance device or resistor 60 to short circuit any alternating component of a flux produced in the core section 56 by the windings 57 and 58. The magnetic core section upon which is mounted the primary winding 52 is provided with an air gap in order to concentrate the flux generated by the windings 57 and 58 in the magnetic core sections on which are mounted the windings 49 and 50. In addition the device 51 may be provided with a magnetic bypass or shunt 61 in order to limit the exciting or magnetizing current when the core sections of the windings 49 and 50 are in a saturated condition.

The above described power circuit is substantially identical with that of Fig. 3 of my above mentioned patent, in which a detailed explanation of its operation may be found. In brief, if the grids 19 are energized with components of alternating potential of peaked wave form from their associated rectifier excitation transformers 24, 25 and 26, the network 13, together with the associated anodes 17 of the discharge device 16, will act as a half wave rectifier circuit supplying a half cycle of alternating current to the left-hand portion of the primary winding of the output transformer 15. If the circuit is operating under unity power factor conditions, substantially 180 electrical degrees later, referred to the load circuit, the rectifier excitation will be removed from the grids 19 and impressed upon the grids 20. The network 14 and its associated anodes 18 now operate as a half wave rectifier supplying current to the right hand portion of the primary winding of the transformer 15, thus generating a half cycle of alternating current of opposite polarity in the load circuit 11.

If the alternating current circuit 11 is supplying a lagging power factor load, the current will persist in the network 13 and its associated anodes 17 after the rectifier excitation has been removed from the grids 19. In order to prevent this current from continuing to flow in the last anode path acting as a rectifier, which would tend to cause a short circuit in case of a moderately low power factor load, the grids 19 receive a component of inverter excitation of peaked wave form which, when the rectifier excitation is removed, is effective to transfer the current between the several anodes 17 and thus maintain control over the various anode paths.

During those portions of the cycle when the network 13 and its associated anodes 17 are operating as an inverter, the rectifier excitation is delayed to the grids 20 associated with the anodes 18 connected to the network 14, to prevent the simultaneous flow of current of more than a predetermined value in one network and its associated anodes operating as a rectifier and in the other network and its associated anodes operating as an inverter, which would tend to produce a short circuit on the low frequency circuit 11.

The manner in which the above described results are obtained may be best understood by a detailed consideration of the operation of the grid excitation circuit. The rectifier excitation for the groups of grids 19 and 20 is supplied from the windings A of the excitation transformers 24–29, inclusive, which are in turn excited by the primary windings E energized from the circuit 10 through a rotary phase shifting transformer 36. By adjusting this transformer 36 the phase of the alternating potentials impressed upon the grids may be controlled to vary the output of the networks 13 and 14 and their associated anodes in a manner identical to that of an ordinary grid controlled rectifier.

The rectifier excitation is periodically removed from the groups of grids 19 and 20 by means of the windings D of the groups of rectifier transformers 24, 25 and 26, and 27, 28 and 29, respectively. The windings D of each of these groups of rectifier excitation transformers are energized with unidirectional current impulses from the auxiliary rectifier circuits 39 and 40 respectively. These auxiliary rectifiers are energized through a transformer 41—41' from a source of alternating potential 47 of a frequency which it is desired to supply to the load circuit 11, or, in case the load circuit 11 is connected to an independent source of electromotive force for determining its frequency, it may be energized directly therefrom. If it be assumed that the potentials impressed upon the grids of electric valves 42 and 45 by means of the phase-shifting circuit 53 and the self-saturating transformer 51 are retarded in phase with respect to their anode potentials by approximately 180 electrical degrees, they are maintained non-conductive and electric valves 43 and 44 operate as simple, half wave, single phase rectifier circuits supplied with alternating potentials of opposite polarity so that the windings D of the groups of transformers 24, 25, and 26, and 27, 28, and 29 are alternately energized with positive half cycles from the lower frequency source 47. These windings are so designed as to completely saturate their associated transformers so that when any of the windings D are energized no secondary voltages are produced in the corresponding secondary coils A. In other words, when the windings D of either group of transformers are energized, the rectifier excitation is removed from the corresponding group of grids 19 and 20.

Under the assumed conditions, it will be noted that rectifier excitation is alternately removed from the groups of grids 19 and 20 for intervals of 180 electrical degrees referred to the load circuit. By gradually advancing the phase of the potential applied to the primary winding 52 of the saturable transformer 51 by means of the phase shifting circuit 53, electric valves 42 and 45 may be gradually brought into operation. If it be assumed that the phase rotation is such that the voltages supplied to the anodes of these valves from their associated phases of the network 41 lead the voltages applied to electric valves 43 and 44, as the phase of their grid potentials is gradually advanced, the duration of the positive impulses supplied to the windings D is progressively increased. With 120 degrees phase displacement between the windings of network 41 connected to each of the rectifier circuits 39 and 40, the maximum duration for the energization of the windings D will be 300 electrical degrees. The phase shifting circuit 53 may thus be controlled in accordance with the particular power factor conditions obtaining on the load circuit 11 to supply rectifier excitation to the groups of grids 19 and 20 for a proper portion of each cycle.

It is well known that any electric valve converting apparatus or a system including transformer windings, electric valves, etc. has a certain amount of inherent regulation; that is, a certain drop in voltage upon increase in the load current from no load to a full load due to the impedance of the system. In order to compensate for this natural regulation characteristic, the several rectifier excitation transformers are provided with the windings B, connected in series with the load current of the network and associated anodes controlled by the particular group of transformers. The coils B are preferably designed to only partially saturate their associated control transformers. The effect of this unidirectional saturation of the control transformers is to advance the point in the cycle of alternating potential of the supply circuit 10 at which the resultant flux in the saturable core of each of the transformers reverses polarity, which corresponds to the instant at which a peaked impulse is supplied to the winding A. In this manner the rectifier excitation peaks, or impulses, to the groups of grids 19 and 20 is advanced in phase with increasing load current on the system to tend to increase the average voltage impressed upon the load circuit and thus compensate for the natural regulation of the system.

As explained above, it is advisable continuously to provide a component of inverter excitation to the groups of grids 19 and 20 in order to enable the networks 13 and 14 and their associated anodes to act as inverters under reactive power factor conditions when the rectifier excitation is removed for a portion of each cycle during which current is still flowing. This inverter excitation is provided by the windings F which, it will be noted, are connected in series with the windings A. These windings are continuously excited by the windings H of the saturable transformers 30-35, inc., the phase of the alternating potentials impressed upon the windings H is adjusted by means of the rotary phase shifting transformer 37 to substantially phase opposition to the potentials impressed upon the groups of anodes 17 and 18, making due allowance for the necessary commutating angle.

It is well understood by those skilled in the art that when operating converting apparatus as an inverter it is necessary to transfer current from an outgoing valve to an incoming valve at a point in the cycle of alternating electromotive force when the counter-electromotive force of the incoming winding is less than that of the outgoing winding, so that there shall be a resultant electromotive force for producing the commutation. The last moment at which this commutation would be theoretically possible would be when their counterelectromotive forces are equal. The phase angle between the instant at which commutation is actually started and that at which it becomes actually and theoretically impossible to effect commutation is referred to as the commutating angle. This angle varies with the reactance of the circuits between which the current is to be commutated and the magnitude of the current which is to be commutated. It is preferable that this commutating angle should be kept as small as possible in order to minimize the distortion in the wave forms of the current and voltage of the system. On the other hand, it is necessary that this commutating angle should be sufficient to provide reliable commutation under the heaviest loads which the apparatus will encounter.

In the above described system this commutating angle may be adjusted to a minimum for light load conditions by means of the rotary phase shifting transformer 37. The windings G of the inverter excitation transformers 30-35 inc., are connected in series with the load current of the network 13 or 14 and its associated anodes which the particular group of transformers control. These windings are designed to only partially saturate the cores of the inverter transformers 30-35, inc., and their effect is similar to that of the windings B of the rectifier excitation transformers; that is, to progressively advance the phase of the inverter excitation in accordance with increases in load on the system. In this manner the commutating angle is progressively increased so that it may be kept at a minimum for each operating condition of the system.

When the component of inverter excitation supplied to the groups of anodes 17 and 18 by the windings F of the inverter excitation transformers 30—35, inc., leads the electromotive force of the networks 13 and 14 appreciably to provide an adequate commutating angle, as described above, the ratio of the voltage of the output circuit 11 to that of the particular one of the networks 13 or 14 operating as an inverter is correspondingly lowered, as is well understood by those skilled in the art. If, at the same time, the rectifier excitation supplied to the group of anodes cooperating with the network operating as rectifier is substantially in phase with the electromotive force of this network, the ratio of the voltage of the alternating current load circuit 11 to the electromotive force of the networks 13 and 14 will be a maximum. In other words, the counter-electromotive force against which the rectifying apparatus is operating, is considerably less, considering the ratio of transformation, than the counter-electromotive force against which the inverting apparatus is operating, so that a circulating current will tend to flow between the networks 13 and 14 and their associated anodes.

As the commutating angle is increased with increasing load on the system, as described above, this effect is accentuated so that an excessive circulating current will tend to flow in the system. Such excessive circulating currents are prevented by the series windings C of the rectifier excitation transformers. It will be noted that these windings C on each group of rectifier excitation transformers 24—25—26 and 27—28—29 are in series with the current transmitted by the network and its associated groups of anodes 17 or 18 controlled by the other group of transformers. Under very light load conditions, the unidirectional current flowing in these windings is effective to progressively retard the phase of the rectifier excitation and thus decrease the ratio of the voltage of the alternating current circuit 11 to that of the particular network which is operating as a rectifier to compensate for a similar decrease in this ratio with respect to the network operating as an inverter, due to the shift in phase of the inverter excitation.

To secure stable operation it is necessary that the number of turns of the windings C on the rectifier excitation transformers is effective to shift the phase of the rectifier excitation at a rate greater than that at which the windings G on the inverter excitation transformer shift the phase of the inverter excitation to provide a proper commutating angle. If this were not so and the inverter excitation were shifted at a rate higher than the rectifier excitation, the ratio of the voltage of the circuit 11 to that of the networks 13 or 14 of the apparatus operating as an inverter would decrease faster than that operating as a rectifier, and the system would tend to build up a cumulatively increasing circulating current and eventually go into short circuit. By properly proportioning the ratio of the turns of the windings C and the windings G, however, the rectifier grid excitation may be retarded faster than the inverter excitation is advanced and, when the load current exceeds a predetermined value, which is preferably not more than a few per cent of normal load current, the windings C are effective to completely saturate their associated rectifier excitation transformers and thus remove the rectifier excitation from the apparatus to prevent the building up of a circulating current.

As mentioned above, in case the frequency ratio of the alternating current supply circuit 10 and the load circuit 11 is non-integral, the successive half cycles of alternating potential of the load circuit are not identical but comprise groups of the supply frequency half cycles which may differ in number by one cycle. For example, a series of half cycles of the low frequency potential may each comprise six half cycles of the supply frequency which will then be followed by a half cycle comprising seven half cycles of the supply frequency. If these longer low frequency half cycles are separated by an even number of half cycles, they will always be produced by the same one of the networks 13 or 14 and will thus be supplied always to the same half of the primary winding of the transformer 15. The result is that the average current supplied to the one half of the primary winding of the transformer 15 is slightly greater than that supplied to the other half so that there is a unidirectional component of flux generated which tends to saturate the core of the transformer 15.

In order to prevent this unidirectional saturation of the output transformer 15, there is provided an equalizing arrangement on the auxiliary transformer device 51 utilized for controlling the holdoff of the rectifier excitation. This consists of the magnetic core section 56 which is common to the saturable sections carrying the secondary windings 49 and 50 which control the auxiliary rectifier apparatus 39 and 40 to periodically remove the rectifier excitation from the grids 19 and 20. On this magnetic core section are mounted windings 57 and 58 connected respectively in series with the current transmitted by the networks 13 and 14 and their associated anodes. The current carried by each of these windings consists of a series of intermittent unidirectional impulses substantially out of phase, so that as long as their average values are equal the magnetomotive force produced in the core section 56 thereby is a pure alternating magnetomotive force. The winding 59 mounted on the same core section and short circuited through a low impedance resistor 60 is effective to substantially short circuit this alternating component of magnetomotive force and thus substantially eliminate its effect upon the windings 49 and 50.

If, however, the average current carried by one of the networks 13 or 14 and its associated anodes tends to become greater than the other, which would result in a saturation of the output transformer 15, as described above, there is produced a resultant unidirectional magnetomotive force in the core section 56 which is not affected by the short circuited winding 59 and which, due to the air gap in the core section on which the primary winding 52 is mounted, is forced almost completely through the core sections on which the windings 49 and 50 are wound. Due to the opposite polarity of the windings 49 and 50, the effect of this unidirectional component in the saturating core sections is opposite, advancing the point in the cycle of alternating potential at which the resultant flux of one of the core sections passes through zero and retarding that of the other. The effect of this is to advance the phase of the grid potential of one of the valves 42 or 45, and retard that of the other. This results in shortening the intervals of rectifier excitation of one of the groups of grids 19 or 20 and lengthening that of the other to compensate for the tendency of one of the networks 13 or 14 and its associated anodes to carry more than its share of the current. In this manner a very accurate balance between the currents carried by the networks 13 and 14 may be maintained to prevent saturation of the output transformer 15.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. An electric valve converting system comprising a higher frequency alternating current circuit, a lower frequency alternating current circuit, means including a plurality of groups of electric valves for transmitting energy therebetween, means for exciting said groups of valves for inverter operation to transmit energy from said lower frequency circuit to said higher frequency circuit, means for modifying said inverter excitation to increase the commutating angle with increase in load current of the system, means for simultaneously exciting said groups of valves for rectifier operation, means for periodically and successively removing the rectifier excitation from said groups of valves at the frequency of said lower frequency circuit, means responsive to the flow of current in each group of valves for removing the rectifier excitation from the other valves, means responsive to the load current of the system for modifying said rectifier excitation to regulate the energy transmitted between said circuits, and means responsive to an unbalance in the currents transmitted by said groups of valves for modifying said rectifier excitation to restore a balance between said currents.

2. An electric valve converting system comprising a higher frequency alternating current circuit, a lower frequency alternating current circuit, means including a plurality of groups of electric valves for transmitting energy therebetween, each of said valves being provided with a control electrode, a plurality of saturable transformers for energizing said control electrodes with a component of said higher frequency alternating potential of peaked wave form for normally exciting said valves for inverter operation, means for variably and partially saturating the transformers associated with each group of valves in accordance with the current transmitted by that group to vary the commutating angle of the inverting valves, a plurality of other saturable transformers for energizing said control electrodes with a component of said higher frequency alternating potential of peaked wave form for exciting said groups of valves for rectifier operation, means for periodically and successively saturating said rectifier excitation transformers at the frequency of said lower frequency circuit, means for saturating the rectifier excitation transformers associated with each group of valves in response to the current transmitted by another group of valves, whereby only one group of valves transmits current at any particular instant, means for partially and variably saturating the rectifier excitation transformers associated with each group of valves in accordance with the current transmitted by that group of valves to regulate the energy transmitted between said circuits, and means responsive to an unbalance in the current transmitted by said groups of valves for oppositely modifying the saturation of the rectifier excitation transformers associated therewith to restore the balance between said currents.

3. In an electric valve converting system comprising a higher frequency alternating current circuit, a lower frequency alternating current circuit, and means including a plurality of groups of electric valves for transmitting energy therebetween, each of said valves being provided with a control electrode, excitation apparatus for said electrodes comprising means for energizing said control electrodes with a component of said higher frequency alternating potential of peaked wave form for normally exciting said valves for inverter operation, a saturable core transformer winding included in the circuit of the control electrode of each of said valves, means for inducing in said transformer windings a higher frequency alternating potential for exciting said valves for rectifier operation, saturating windings for said transformer cores, auxiliary rectifier means for energizing in a predetermined sequence the saturating windings of the transformers associated with said groups of valves, and means for controlling said auxiliary rectifier means to control the portion of each cycle of said low frequency circuit during which said transformers are saturated.

4. In an electric valve converting system comprising a higher frequency alternating current circuit, a lower frequency alternating current circuit, and means including a plurality of groups of main electric valves for transmitting energy therebetween, each of said valves being provided with a control electrode, excitation apparatus for said control electrodes comprising means for energizing said control electrodes with a component of said higher frequency alternating potential of peaked wave form for normally exciting said valves for inverter operation, a saturable core transformer winding included in the circuit of the control electrode of each of said valves, means for inducing in said transformer windings a higher frequency alternating potential for exciting said valves for rectifier operation, saturating windings for said transformer cores, auxiliary polyphase rectifier means including a plurality of auxiliary electric valves, circuit means for energizing the saturating windings of the transformers associated with each group of main valves from two phases of said auxiliary rectifier and their associated auxiliary valves, and means for controlling the conductivity of one of said auxiliary valves to control the portion of each cycle of said low frequency circuit during which said main valves operate as rectifiers.

5. In an electric valve converting system comprising a higher frequency alternating current circuit, a lower frequency alternating current circuit, and means including a plurality of groups of electric valves for transmitting energy therebetween, each of said valves being provided with a control electrode, excitation apparatus for said electrodes comprising means for impressing upon said control electrodes an alternating potential of said higher frequency and of peaked wave form to excite said valves for inverter operation, a saturable core transformer winding included in the circuit of the control electrode of each of said valves, means for inducing in said transformer windings a higher frequency alternating potential for exciting said valves for rectifier operation, and means responsive to the flow of current in one group of valves for saturating the cores of said transformer windings associated with another group of valves.

6. In an electric valve converting system comprising a higher frequency alternating current circuit, a lower frequency alternating current circuit, and means including a pair of groups of electric valves for transmitting energy therebetween, each of said valves being provided with a control electrode, excitation apparatus for said electrodes comprising means for impressing upon said control electrodes an alternating potential of said higher frequency and of peaked wave form to excite said valves for inverter operation, a saturable core transformer winding included in the circuit of the control electrode of each of said valves, means for inducing in said transformer windings a higher frequency alternating potential for exciting said valves for rectifier operation, and a saturating winding for each of said transformer cores, the saturating windings of the transformer cores associated with one group of valves being connected to carry a current proportional to the current transmitted by the other group of valves and designed completely to saturate their respective transformer cores whereby the simultaneous operation of said groups of valves is prevented.

7. In an electric valve converting system comprising a supply circuit, a load circuit, one of said circuits being an alternating current circuit, and means including a plurality of electric valves for transmitting energy therebetween, each of said valves being provided with a control electrode, excitation apparatus for said electrodes comprising a control circuit for each of said valves including a saturable core transformer winding, means for exciting said transformer windings with an alternating potential of the frequency of said alternating current circuit, and means for variably saturating the cores of said transformer windings in response to the load current of the system to regulate the energy transmitted from said supply circuit to said load circuit.

8. In an electric valve frequency converting system comprising an alternating current supply circuit, an alternating current load circuit and means including a plurality of electric valves for transmitting energy therebetween, each of said valves being provided with a control electrode, excitation apparatus for said electrodes comprising a saturable core transformer winding included in the circuit of the control electrode of each of said valves, means for energizing said transformer windings in a predetermined sequence with alternating potentials of the frequency of said supply circuit and of a phase to excite said valves for rectifier operation, and means for variably saturating the cores of said transformer windings in response to the load current of the system to regulate the energy transmitted from said supply circuit to said load circuit.

9. In an electric valve converting system comprising a higher frequency alternating current supply circuit, a lower frequency alternating current load circuit, and means including a plurality of groups of electric valves for transmitting energy therebetween, each of said valves being provided with a control electrode, excitation apparatus for said electrodes comprising means for impressing upon said control electrodes an alternating potential of said higher frequency and of peaked wave form to excite said valves for inverter operation, a saturable core transformer winding included in the circuit of the control electrode of each of said valves, means for inducing in said transformer windings a higher frequency alternating potential for exciting said valves for rectifier operation, and means responsive to the flow of current in each group of electric valves for varying the saturation of its associated control transformers to regulate the energy transmitted from said supply circuit to said load circuit.

10. In an electric valve converting system comprising a higher frequency alternating current supply circuit, a lower frequency alternating current load circuit, and means including a plurality of groups of electric valves for transmitting energy therebetween, each of said valves being provided with a control electrode, excitation apparatus for said electrodes comprising means for impressing upon said control electrodes an alternating potential of said higher frequency and of peaked wave form to excite said valves for inverter operation, a saturable core transformer winding included in the circuit of the control electrode of each of said valves, means for inducing in said transformer windings a higher frequency alternating potential for exciting said valves for rectifier operation, and a saturating winding for each of said transformer cores, the saturating windings of the transformer cores associated with each group of valves being connected to carry a current proportional to the current transmitted by their respective group of valves and designed to variably and incompletely saturate their respective transformer cores to regulate the energy transmitted from said supply circuit to said load circuit.

11. In an electric valve converting system comprising a supply circuit, a load circuit, one of said circuits being an alternating current circuit, and means including a plurality of electric valves for transmitting energy therebetween, each of said valves being provided with a control electrode, excitation apparatus for said electrodes comprising a control circuit for each of said valves including a saturable core transformer winding, means for energizing said transformer windings in a predetermined sequence with alternating potentials of the frequency of said alternating current circuit and of a phase to excite said valves for inverter operation, and means for variably saturating the cores of said transformer windings in response to the load current of the system to increase the commutating angle with increasing load.

12. In an electric valve converting system comprising a higher frequency alternating current circuit, a lower frequency alternating current circuit, and means including a plurality of groups of electric valves for transmitting energy therebetween, excitation apparatus for said system comprising means for exciting one of said groups of valves for rectifier operation to transmit energy from the higher frequency circuit to the lower frequency circuit, means for simultaneously exciting another group of valves for inverter operation to transmit energy from the lower frequency circuit to the higher frequency circuit, and means responsive to the load current of the system for modifying said inverter excitation to control the commutating angle.

13. In an electric valve converting system comprising a higher frequency alternating current circuit, a lower frequency alternating current circuit, and means including a plurality of groups of electric valves for transmitting energy therebetween, each of said valves being provided with a control electrode, excitation apparatus for said system comprising means for exciting one of said groups of valves for rectifier operation to transmit energy from the higher frequency circuit to the lower frequency circuit, means for simultaneously energizing the control electrodes of another group of valves with an alternating potential of said higher frequency to excite said valves for inverter operation, and means for varying the phase of said inverter excitation in accordance with the load current of the system to vary the commutating angle.

14. In an electric valve converting system comprising a higher frequency alternating current circuit, a lower frequency alternating current circuit, and means including a plurality of groups of electric valves for transmitting energy therebetween, each of said valves being provided with a control electrode, excitation apparatus for said electrodes comprising means for impressing upon said control electrodes an alternating potential of said higher frequency and of peaked wave form to excite said valves for rectifier operation, a saturable core transformer winding included in the circuit of the control electrode of each of said valves, means for inducing in said transformer windings a higher frequency alternating potential for exciting said valves for inverter operation, and means responsive to the flow of current in each group of valves for varying the saturation of the cores of the transformer windings associated therewith to vary the commutating angle.

15. In an electric valve converting system comprising a higher frequency alternating current circuit, a lower frequency alternating current circuit, and means including a plurality of groups of electric valves for transmitting energy therebetween, each of said valves being provided with a control electrode, excitation apparatus for said electrodes comprising means for impressing upon said control electrodes an alternating potential of said higher frequency and of peaked wave form to excite said valves for rectifier operation, a saturable core transformer winding included in the circuit of the control electrode of each of said valves, means for inducing in said transformer windings a higher frequency alternating potential for exciting said valves for inverter operation, and a saturating winding for each of said transformer cores, the saturating windings of the transformer cores associated with one group of valves being connected to carry a current proportional to the current transmitted by their respective groups of valves and designed to variably and incompletely saturate their respective transformer cores to regulate the commutating angle at which the inverting valves of the system operate.

16. In an electric valve converting system comprising a higher frequency alternating current circuit, a lower frequency alternating current circuit, and means including a plurality of groups of electric valves for transmitting energy therebetween, excitation apparatus for said system comprising means for successively exciting said groups of valves for rectifier operation to transmit energy to said low frequency circuit, and means for modifying said rectifier excitation in response to an unbalance in the currents transmitted by said groups of valves.

17. In an electric valve converting system comprising a higher frequency alternating current circuit, a lower frequency alternating current circuit, and means including a plurality of groups of electric valves for transmitting energy therebetween, excitation apparatus for said system comprising means for exciting said groups of valves for rectifier operation to transmit energy from said high frequency circuit to said low frequency circuit, means including auxiliary electric valve means for successively removing said rectifier excitation from said groups of valves at the frequency of said low frequency circuit, and means for controlling said auxiliary electric valve means in response to an unbalance in the currents transmitted by said groups of valves.

18. In an electric valve converting system comprising a higher frequency alternating current circuit, a lower frequency alternating current circuit, and means including a plurality of groups of electric valves for transmitting energy therebetween, excitation apparatus for said system comprising means for exciting said groups of valves for rectifier operation to transmit energy from said high frequency circuit to said low frequency circuit, means including auxiliary electric valve means for successively removing said rectifier excitation from said groups of valves at the frequency of said low frequency circuit, a transformer device provided with an exciting winding connected to be energized at said low frequency and with a saturable magnetic core section and a secondary winding mounted thereon and connected to control said auxiliary valve means, and means for saturating said magnetic core section in accordance with an unbalance in the currents transmitted by said groups of valves.

19. In an electric valve converting system comprising a higher frequency alternating current circuit, a lower frequency alternating current circuit, and means including a pair of groups of electric valves for transmitting energy therebetween, excitation apparatus for said system comprising means for exciting said groups of valves for rectifier operation to transmit energy from said high frequency circuit to said low frequency circuit, means including a pair of auxiliary electric valve means each connected to periodically remove said rectifier excitation from one of said groups of valves at the frequency of said low frequency circuit, a transformer device provided with an exciting winding connected to be energized at said low frequency and with a pair of saturable magnetic core sections, each having a winding connected to control one of said auxiliary valve means, the saturable magnetic core sections having a common magnetic path, and a winding connected in series with each of said groups of valves, said windings being differentially mounted to link the common magnetic path of said core sections and the windings mounted on said saturable core sections being connected to be oppositely influenced by a differential magnetization of their common path.

20. In an electric valve translating circuit, a source of alternating potential, a self-saturating transformer energized therefrom and provided with a secondary winding in which is induced an alternating potential of peaked wave form, an auxiliary saturating winding for said transformer, a source of periodic current connected to said winding, said periodic current having a unidirectional component effective to determine the phase of the secondary alternating potential of peaked wave form, and means for substantially eliminating the effect of the periodic component of said periodic current upon the phase of said secondary potential.

21. In an electric valve translating circuit, a source of alternating potential, a self-saturating transformer energized therefrom and provided with a secondary winding in which is induced an alternating potential of peaked wave form, a source of periodic current having a unidirectional component, a saturating winding for said transformer energized from said source of periodic current, and an additional winding for said transformer closed through a low impedance path and effective to reduce to substantially zero the flux of said transformer due to the periodic component of said periodic current.

22. In an electric valve translating circuit, a source of alternating potential, a self-saturating transformer energized therefrom and provided with a secondary winding in which is induced an alternating potential of peaked wave form, a pair of auxiliary saturating windings for said transformer, and two sources of periodic current each connected to one of said saturating windings, each of said periodic currents having a unidirectional component and the algebraic sum of said unidirectional components being effective to determine the phase of the secondary alternating potential of peaked wave form.

23. In an electric valve translating circuit, a source of alternating potential, a self-saturating transformer energized therefrom and provided with a secondary winding in which is induced an alternating potential of peaked wave form, two sources of periodic current each having a unidirectional component, a pair of saturating windings differentially energized from said sources, the resultant of the unidirectional components of said periodic currents being effective to determine the phase of the secondary alternating potential of peaked wave form, and means for substantially eliminating the effect of the periodic component of said periodic currents upon the phase of said secondary potential.

24. In an electric valve converting system comprising a higher frequency alternating current circuit, a lower frequency alternating current circuit, means including a plurality of electric valves for transmitting energy therebetween, excitation apparatus for said system comprising means for exciting one group of valves for rectifier operation to transmit energy from the higher frequency circuit to the lower frequency circuit and means for exciting another group of valves for inverter operation, means responsive to the current transmitted by said valves for shifting the phase of said inverter excitation, and current responsive means for shifting the phase of the rectifier excitation at the proper rate and sense to prevent a circulating current from flowing between said groups of valves.

25. In an electric valve converting system comprising a higher frequency alternating current circuit, a lower frequency alternating current circuit, means including a plurality of groups of electric valves for transmitting energy therebetween, excitation apparatus for said system comprising means for exciting one of said groups of valves for rectifier operation to transmit energy from the higher frequency circuit to the lower frequency circuit and means for simultaneously exciting another group of valves for inverter operation to transmit energy in the opposite direction, means for shifting the phase of the inverter excitation in response to current transmitted by said valves, and means for shifting the phase of the rectifier excitation at a rate greater than the rate of phase shift of said inverter excitation.

26. In an electric valve converting system comprising a higher frequency alternating current circuit, a lower frequency alternating current circuit, means including a plurality of groups of electric valves for transmitting energy therebetween, excitation apparatus for said system comprising means for exciting one of said groups of valves for rectifier operation, means for exciting simultaneously another group of valves for inverter operation, means for shifting the phase of said inverter excitation in response to current transmitted by said system, and means for shifting in opposite sense the phase of said rectifier excitation at a rate greater than the rate of phase shift of said inverter excitation, said latter means operating to remove said rectifier excitation in response to current in excess of a predetermined amount.

27. In an electric valve converting system comprising a supply circuit, a load circuit, one of said circuits being an alternating current circuit, means including a plurality of electric valves for transmitting energy therebetween, each of said valves being provided with a control electrode, excitation apparatus for said electrodes of said valves comprising means for exciting some of said valves for rectifier operation, means for exciting others of said valves for inverter operation, means for shifting the phase of the inverter excitation in response to current transmitted by said valves, and means for shifting the phase of the rectifier excitation at a rate greater than the phase shift of said inverter excitation.

BURNICE D. BEDFORD.